United States Patent
Burkhardt et al.

(10) Patent No.: US 9,915,551 B2
(45) Date of Patent: Mar. 13, 2018

(54) METHOD FOR DYNAMIC LINEARISATION OF SENSOR SIGNALS FROM A MAGNETIC STRIP LENGTH MEASURING SYSTEM

(71) Applicant: Balluff GmbH, Neuhausen a.d.F. (DE)

(72) Inventors: Thomas Burkhardt, Zell (DE); Achim Zern, Heilbronn (DE); Timm Eversmeyer, Esslingen (DE)

(73) Assignee: Balluff GmbH, Neuhausen a.d.F. (DE)

( * ) Notice: Subject to any disclaimer, the term of this patent is extended or adjusted under 35 U.S.C. 154(b) by 72 days.

(21) Appl. No.: 14/906,947

(22) PCT Filed: Jul. 23, 2013

(86) PCT No.: PCT/DE2013/000398
§ 371 (c)(1),
(2) Date: Jan. 22, 2016

(87) PCT Pub. No.: WO2015/010669
PCT Pub. Date: Jan. 29, 2015

(65) Prior Publication Data
US 2016/0178394 A1    Jun. 23, 2016

(51) Int. Cl.
*G01D 5/24*    (2006.01)
*G01D 5/14*    (2006.01)
*G01D 5/244*   (2006.01)

(52) U.S. Cl.
CPC ........... *G01D 5/14* (2013.01); *G01D 5/24461* (2013.01)

(58) Field of Classification Search
CPC ........ G01D 5/14; G01D 5/24461; G01P 3/44; G01N 27/902; G01N 27/9026; G01N 27/9033; G01R 35/005
See application file for complete search history.

(56) References Cited

U.S. PATENT DOCUMENTS

| | | | |
|---|---|---|---|
| 3,809,895 A | 5/1974 | Taisne | |
| 5,063,291 A | 11/1991 | Buehring | |
| 5,677,686 A | 10/1997 | Kachi et al. | |
| 7,254,991 B2 | 8/2007 | Stork et al. | |
| 8,606,052 B2 | 12/2013 | Mercur'Ev | |

(Continued)

FOREIGN PATENT DOCUMENTS

| | | |
|---|---|---|
| CN | 1048921 A | 1/1991 |
| CN | 1117577 A | 2/1996 |

(Continued)

OTHER PUBLICATIONS

Chinese Office Action in CN 201380079131.7, dated Jan. 5, 2017.
International Search Report of PCT/DE2013/000398, dated Apr. 2, 2014.

*Primary Examiner* — Julian Huffman
*Assistant Examiner* — Michael Konczal
(74) *Attorney, Agent, or Firm* — Collard & Roe, P.C.

(57) ABSTRACT

A method for linearizing sensor signals in a magnetic strip length measuring system moves a sensor head between two magnetic poles of a measurement body. In particular, linearization takes place dynamically during operation of the magnetic strip length measuring system, and linearization deviations are compensated by extrapolation as the sensor head moves between the two poles of the measurement body from pole to pole or from pole pair to pole pair.

9 Claims, 8 Drawing Sheets

(56) References Cited

U.S. PATENT DOCUMENTS

| | | | |
|---|---|---|---|
| 8,659,290 B2 * | 2/2014 | Shimizu | G01D 5/145 |
| | | | 324/244 |
| 8,844,152 B2 | 9/2014 | Frank et al. | |
| 2012/0072169 A1 * | 3/2012 | Gribble | G01D 5/24461 |
| | | | 702/150 |

FOREIGN PATENT DOCUMENTS

| | | | |
|---|---|---|---|
| CN | 102749023 A | 10/2012 | |
| CN | 102891952 A | 1/2013 | |
| DE | 10 2006 017 865 A1 | 10/2007 | |
| DE | 10 2010 010805 A1 | 9/2011 | |
| EP | 1 536 239 A2 | 6/2005 | |
| EP | 1 630 363 A1 | 3/2006 | |
| JP | 2002-206949 A | 7/2002 | |
| WO | 2010/139964 A2 | 12/2010 | |
| WO | WO 2010139964 A2 * | 12/2010 | ......... G01D 5/24461 |

* cited by examiner

METHOD FOR DYNAMIC LINEARISATION OF SENSOR SIGNALS FROM A MAGNETIC STRIP LENGTH MEASURING SYSTEM

The invention arises from a method for linearisation of sensor signals from a magnetic strip length measuring system according to the type of the independent claim.

PRIOR ART

In the field of measurement technology, length measuring systems according to this type were known in which a sensor head is moved via a measurement body which is magnetised with alternating polarity. Due to the movement, in the ideal case, a sinusoidal sensor signal is generated in the sensor head or magnetic field sensor. According to the magnetic measurement principle, the signal course is repeated in the sensor head with each pole of the measurement body (e.g. in the case of GMR or AMR sensors which measure the square of the magnetic flux density $B^2$) or with each pole pair of the measurement body. (e.g. in the case of Hall sensors which supply an output voltage which is proportional to the product of magnetic field strength and current). The position determination occurs in an intrinsically known manner, for example by means of trigonometric functions.

Due to unavoidable tolerances, for example of the measurement body or of the distance between the sensor head and the measurement body, as well as due to variable environmental conditions (electrical, magnetic, caused by temperature, etc.), undesired linearity deviations of the measuring system occur. Further possible causes for these deviations are constructional tolerances of the measurement body or tolerances of the magnetic field generated by the measurement body caused by inhomogeneities of the magnetic material or of the magnetisation. The linearity or linearity deviations of the measurement signal are also influenced by the electronics located in the sensor head or subsequent to the sensor head. Below, linearity deviations substantially caused by the sensor head and constant outer magnetic field are considered.

Additionally, the sensor signal itself deviates in practice from an ideal sine signal and in particular has a different amplitude to this as well as a different offset.

Furthermore, it is known, in addition to the specified sensor detecting the sine signal, to arrange a second sensor in the sensor head, by means of which a cosine signal which is phase-shifted compared to the sine signal by 90° is detected. As is known, the clarity of the measurement signal within a measurement period is ensured by means of the second sensor, as only the combination of a sine signal and cosine signal allows a clear evaluation of the measurement signal within a period.

It must be noted that the first sensor and the second sensor can be arranged at a distance of a phase shift of 90° from each other, wherein the two sensors are sensitive in the same direction. Alternatively or additionally, it can be provided that the two sensors are sensitive in directions which are rotated by 90° from each other. An angle sensor can additionally be achieved by detecting a sine signal and a cosine signal.

The two sensor signals are supplied to a so-called "interpolator" which compensates for the offset, the amplitude and the phase of the sine signal as well as the cosine signal in an intrinsically known manner. This occurs either statically by a one-time calibration procedure or by creation of a correction table by means of a reference system still during the production of the sensor or length measuring system, or, however, dynamically, wherein the internal reinforcement and offset parameters are varied during the movement of the sensor head such that sensor signals which are as ideal as possible for the further processing are formed.

Due to the two phase-shifted sensor signals, the amount of the phase shift compared to the ideal 90° represents an influencing variable on the linearity, which likewise can be compensated for by a specified interpolator.

Additionally, it is also known to compensate linearity deviations caused by harmonic waves of the detected sensor signal. These harmonic waves can therefore already be compensated for in the magnetic field sensor by particular arrangement of the magnetic structures. In the case of large pole widths, the harmonic waves are reduced by the use of several angle sensors as well as weighted evaluation of the measurement data.

Alternatively, different amplitudes, different offsets, phase deviations of approximately 90° as well as harmonic waves can be compensated for by a pole-periodic correction signal being added within a pole period to an already determined position. A suitable correction signal can, for example, be determined on a reference system beforehand. The thus determined position data are converted by a subsequent correction table into linearised position data. As this is a static correction signal, this type of compensation requires, in a disadvantageous manner, that the upper deviations with regard to amplitude, offset, phase and the harmonic wave proportion in the signal course of the magnetic field sensor remain substantially constant. Additionally, the linearity deviation should not be influenced by the gap between the sensor head and the measurement body or the sensor temperature. As this influence, however, is present in the case of most sensors, a specified static composition is not possible in many cases.

DISCLOSURE OF THE INVENTION

The object of the invention is to dispel the specified disadvantages of known magnetic strip length measuring systems and to enable a dynamic compensation of nonlinearities of magnetic field sensors described at the beginning.

The method according to the invention enables the compensation of known nonlinearities during operation of the measuring system, i.e. during the movement of the sensor head along the measurement body. Therefore, a low number of sensors or inexpensive sensors can be used, via which such a length measuring system is able to be produced in a substantially more cost-efficient manner than in the measuring systems known in prior art. Additionally, an expensive calibration can be omitted during the production of the sensors.

Particular advantages result in the case of such measuring systems for which the movement speed of the sensor head is able to be regulated and for which a relatively large gap region is required. Due to the larger gap, correspondingly larger pole widths must be used.

Furthermore, the invention enables the use of a uniform sensor type for different pole widths. Should, for example, a larger gap be needed, it is only necessary to switch to a measurement body with a larger pole width. This is because, in particular the phase between the two sensors (sine and cosine) is thereby changed which, however, does not play a role in the evaluation by means of the proposed compensation method. By changing the pole width, the resolution of the output signals is also changed. For linear drives, the measurement body can be completely dispensed with and only the magnetic field of the stator can be used for distance measurement. This offers a considerable cost advantage.

The invention additionally enables, in the case of a specified compensation of linearity deviations, harmonic waves of the detected sensor signal and/or the angle offset of the sensor signal to be considered such that a dynamic adaptation of these influencing variables can be implemented depending on the movement speed or consistency of the movement speed of the sensor head.

The invention furthermore enables a specified correction table to be constantly adapted dynamically, i.e. also during an ongoing measurement, and with a residual linearity deviation which is clearly reduced compared to prior art.

The length measuring system according to the invention is suitable for highly precise length measurement, in particular in the case of linear drives, laser cutting systems, printing systems, in machine construction, for punching or rotary tables, with the advantages described here.

SHORT DESCRIPTION OF THE FIGURES

Figure 3A:
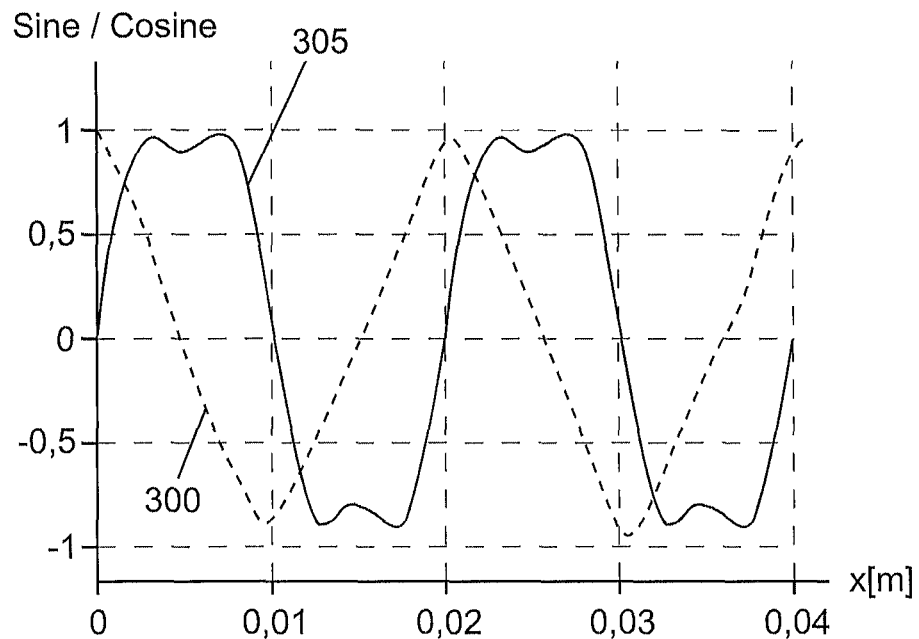
Figure 4A:
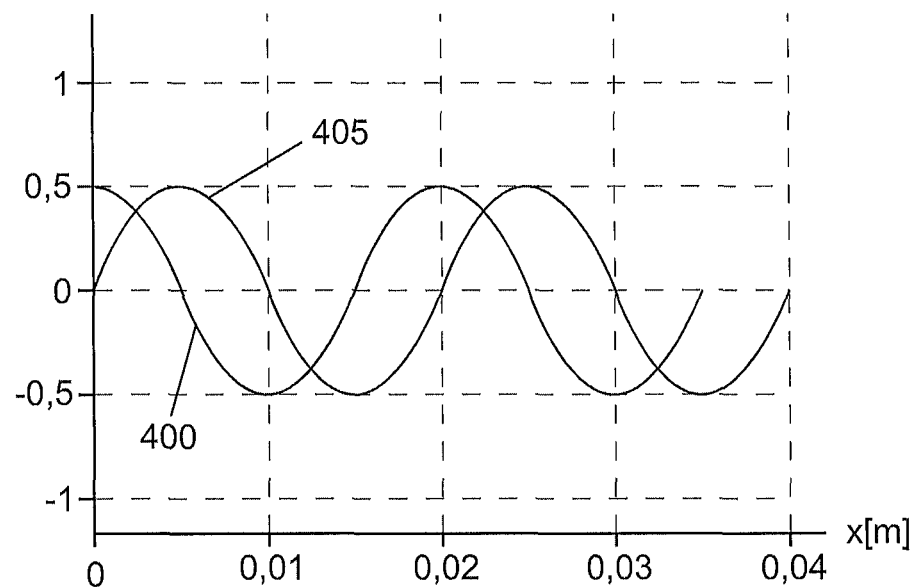
Figure 5A:
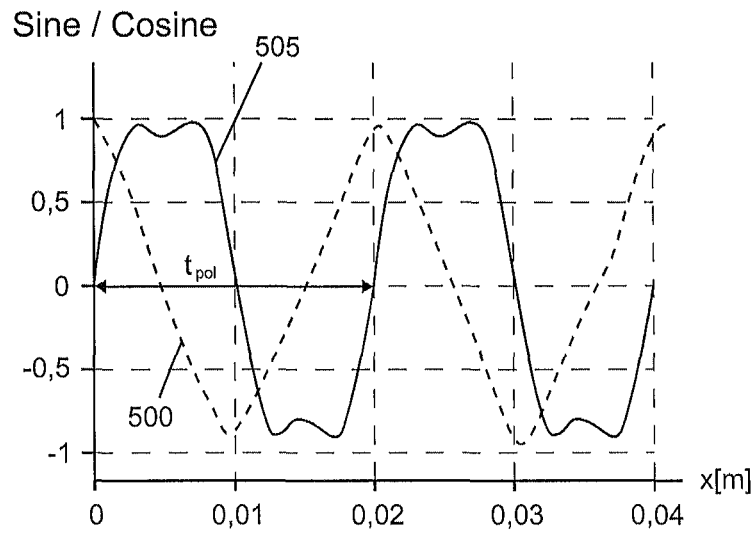
Figure 5B:
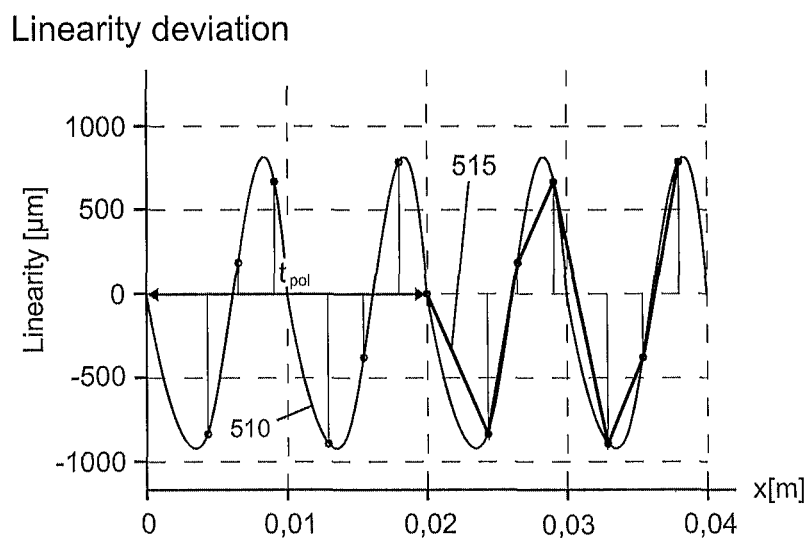
Figure 5C:
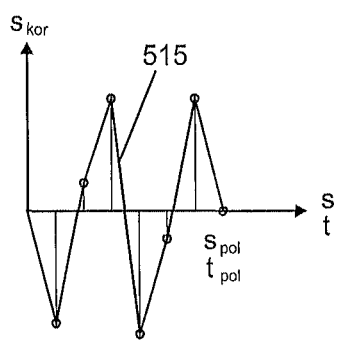
Figure 6:
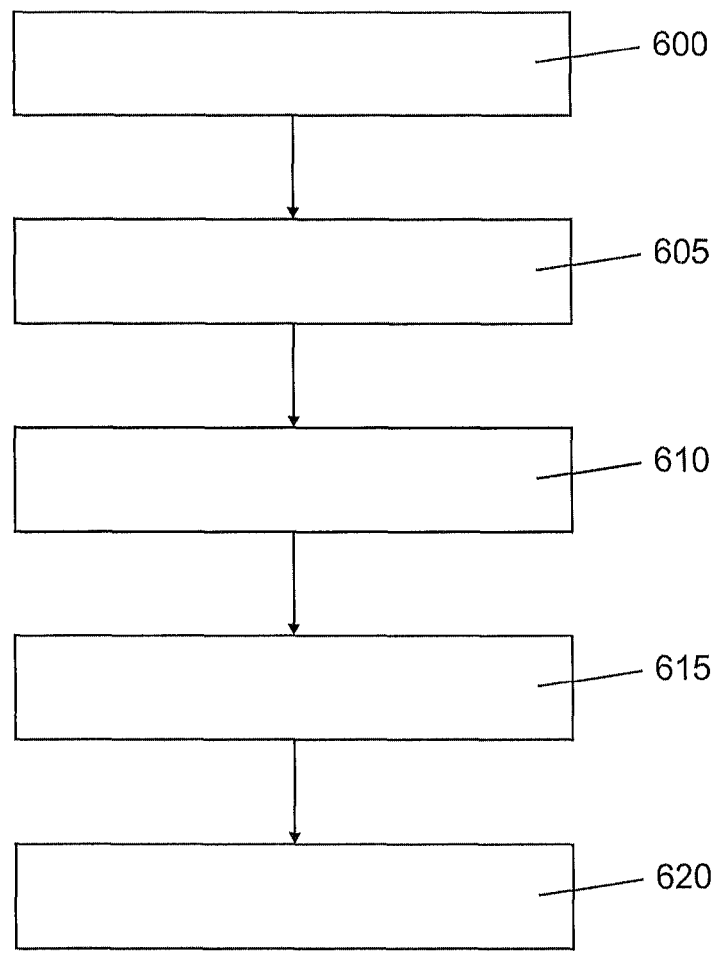
Figure 7A:
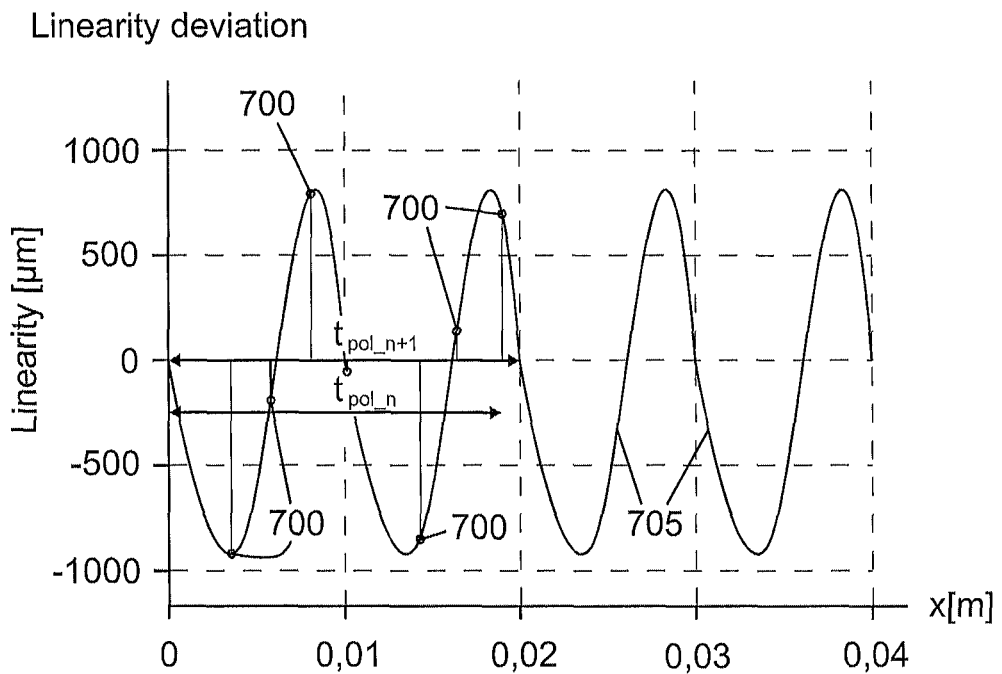
Figure 8A:
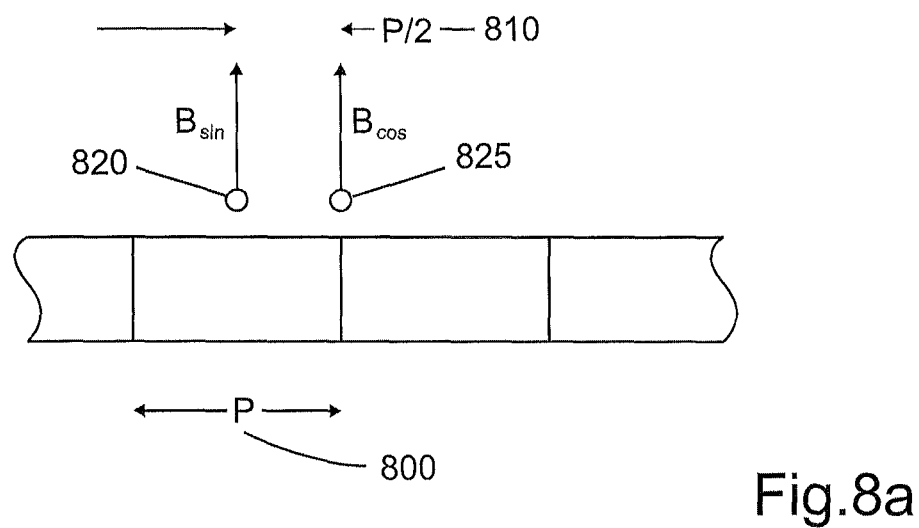
Figure 9:
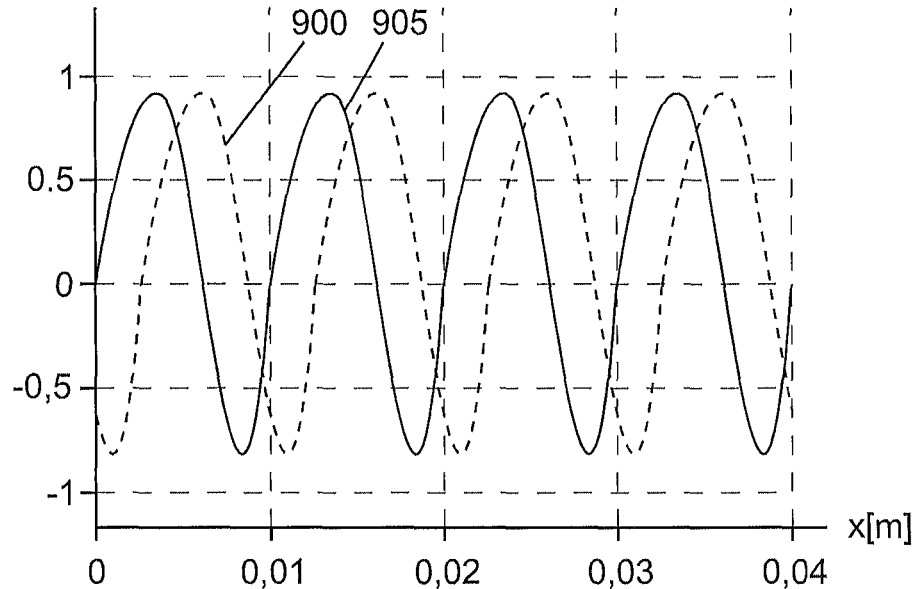
Figure 10:
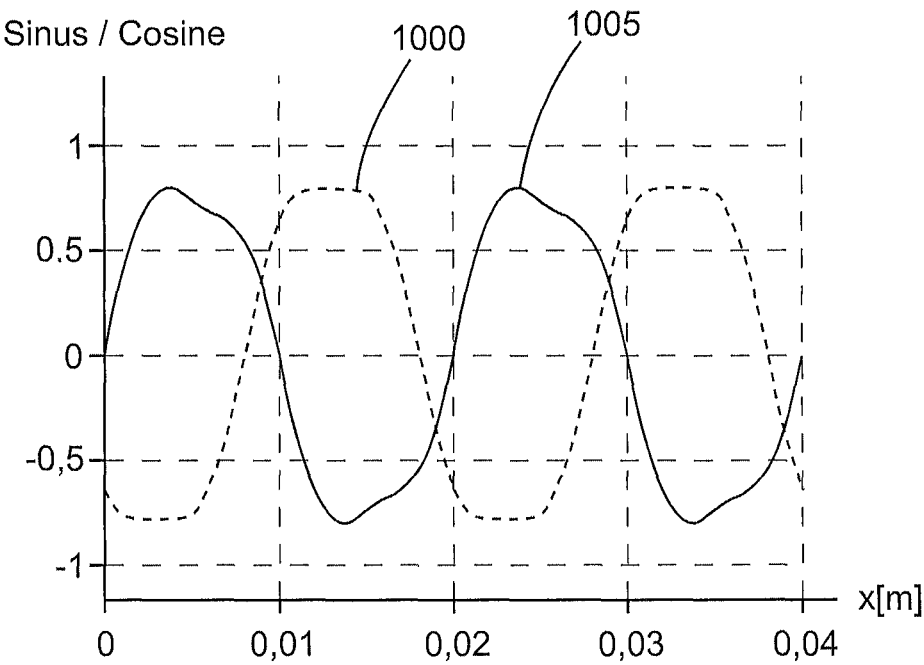

FIG. 3a, b show sensor signals simulated for a small gap having a relatively large linearity deviation;

FIG. 4a, b show sensor signals simulated for a large gap having a relatively small linearity deviation;

FIG. 5a-c show an embodiment of the procedure according to the invention for linearisation of a sensor signal according to FIG. 3a as well as a linearly interpolated correction curve (FIG. 5c) resulting from FIG. 5b;

FIG. 6 shows an embodiment of the method according to the invention for dynamic linearisation of sensor signals of a magnetic strip length measuring system by means of a flow diagram;

FIG. 7a, b show a correction curve similar to FIGS. 5b and 5c in the case of a delayed movement of the sensor head;

FIG. 8a, b illustrate a measuring situation in which the distance of two sensors of the sensor head does not amount to exactly 90°;

FIG. 9 illustrates a measuring situation in which the measuring signals of two sensors of the sensor head are phase-shifted by less than 90° from each other;

FIG. 10 shows the signal ratios as an example of a measurement body formed by a stator field of a linear motor.

DETAILED DESCRIPTION OF THE EMBODIMENTS

Figure 1:
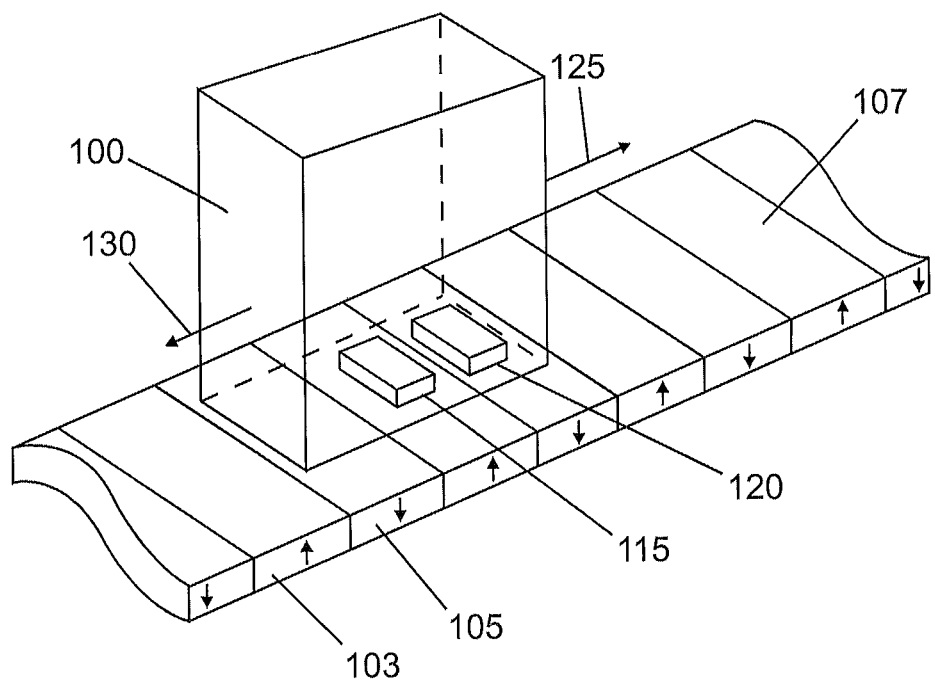
FIG. 1 shows schematically an isometric view of a magnetic strip length measuring system according to prior art.

The contactless magnetic strip length measuring system shown in FIG. 1 comprises a sensor head 100 and a magnetically coded magnetic strip measurement body 107. The sensor head 100 slides over the measurement body 107 which is magnetised in the measuring direction 125, 130 with alternating polarity 103, 105 at a distance of approximately 2 to 6 mm. The sensor head 100 comprises two sensor elements 115, 120 in the embodiment.

In the case of a movement of the sensor head 100 in the direction 125, 130 of the changing polarity, a signal is generated respectively in the two sensor elements 115, 120 which runs in a sinusoidal manner in the ideal case, wherein the first sensor element 115 detects a sinus signal and wherein the second sensor element 120 detects a cosine signal which is phase-shifted compared to the sine signal by 90°. The resulting period change is counted or the position of the sensor element 115, 120 within a period is determined by means of intrinsically known evaluation electronics.

According to the magnetic measurement principle, the period duration of the generated signal corresponds to the length of a pole, for example in the case of GMR or AMR sensors which measure $B^2$. In the case of, for example, Hall sensors, which measure B, the signal period corresponds, however, to the length of a pole pair. The movement speed of the sensor head amounts to up to 20 m/s, wherein, despite the specified relatively large distances of up to 6 mm, the measurement resolution lies in the movement direction of the sensor head in the range of up to 100 µm.

Even in the case of the presence of a (not shown) constant external magnetic field, the length of the signal period amounts to a pole pair, as the fields of the north and south poles 103, 105 of the measurement body 107 are influenced differently by the external magnetic field. Therefore, the linearity deviation also has a correspondingly periodic portion.

The linearity deviation changes, according to the sensor and pole width used, significantly with the distance between the sensor head and the measurement body, i.e. with the size of the gap. If the outer magnetic ratios differ only slightly, for example due to interference fields, and the poles are substantially magnetised equally strongly, then the signal course is very similar in a subsequent period to the previous signal course.

Figure 2:
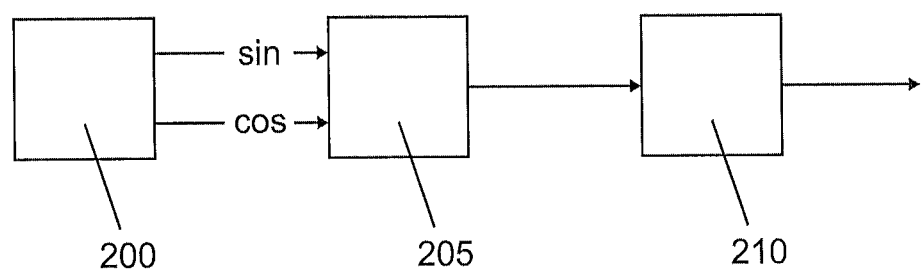
FIG. 2 shows a block diagram for illustration of the correction of a linearity deviation caused by harmonic waves according to prior art.

FIG. 2 shows, by means of a block diagram, an intrinsically known procedure for correction of a linearity deviation caused by harmonic waves. A magnetic field sensor 200 comprising the two sensor elements 115, 120 supplies the specified sine and cosine signals. These signals are supplied to an interpolator 205 which calculates position data still containing harmonic waves (possibly considering offset, phase and amplitude of the signals). These position data are linearised by means of a correction table 210, with which linearised position data are present at the output of the correction table. These position data have no disadvantageous deviation from the linearity described above.

Figure 3B:
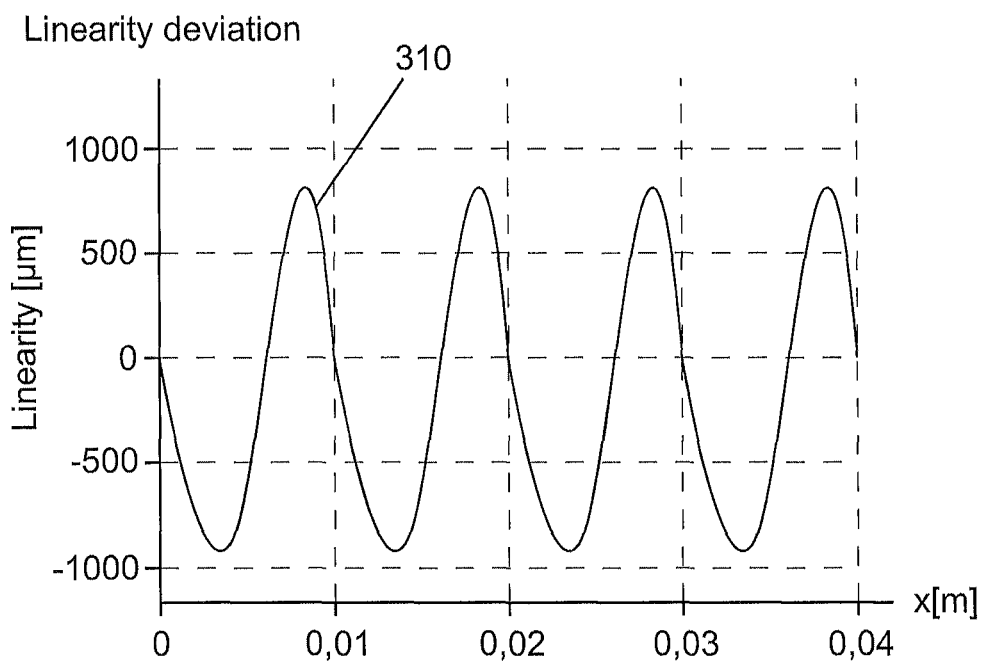

In FIGS. 3a and 3b, exemplary sinusoidal and cosinusoidal magnetic field sensor signals 300, 305 which are generated by a simulation calculation (FIG. 3a) are depicted with a very high and respectively different harmonic wave proportion over the path x[m]. These ratios result in reality for relatively long poles and a relatively small gap. The linearity deviation 310 resulting from this and shown in FIG. 3b, which, as already explained, is itself periodic, is correspondingly large.

Figure 4B:
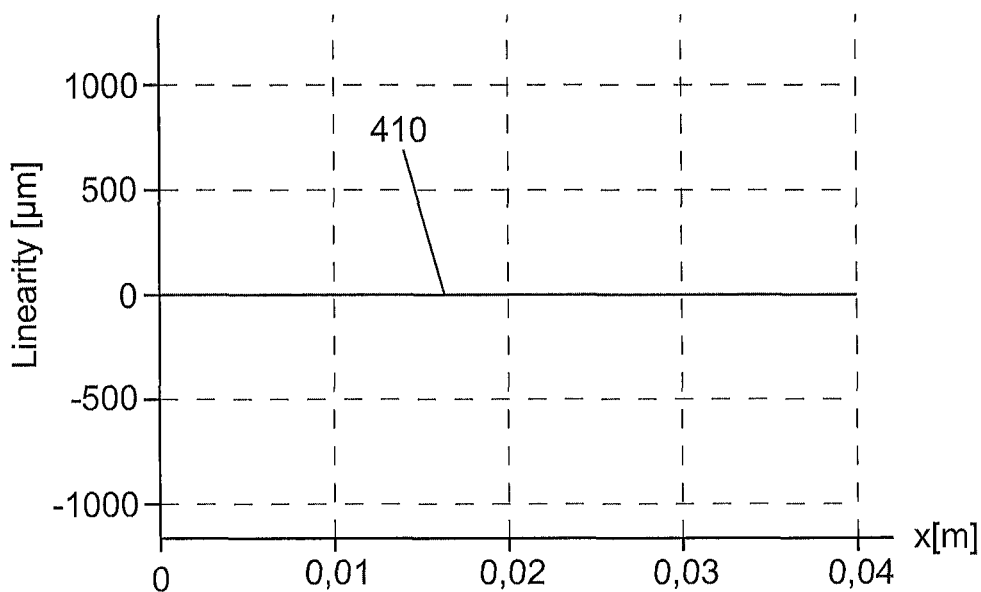

In FIGS. 4a and 4b, corresponding results of the specified simulation calculation are depicted on an intrinsically identical sensor which has only one gap which is larger compared to FIGS. 3a and 3b. The sensor signals 400, 405 resulting for this sensor configuration (FIG. 4a) are almost ideally sinusoidal or cosinusoidal; only the signal amplitude is smaller than in the example according to FIGS. 3a and 3b. In particular, the linearity deviation 410 derived from this, as is evident in FIG. 4b, is very low or almost constantly zero.

According to FIGS. 3a and 3b as well as 4a and 4b, the resulting sensor signals are dependent on the size of the gap between the sensor head and the measurement body in a very sensitive manner. In particular, the corresponding linearity deviations cannot be corrected by means of a static or fixed correction table.

In the subsequently described embodiment, it is assumed that the sensor head is moved with a relatively constant high speed. The magnetic fields generated by all pole pairs are identical and the gap between the sensor head and the measurement body differ only very slowly from pole to pole such that the variation shown in FIGS. 3a and 3b and 4a and 4b only occurs over several poles, whereby the signal course of a currently measured pole is similar to the signal course of the previous and the next pole.

FIGS. 5a and 5b show an embodiment of the method according to the invention for linearisation of a sensor signal shown in FIG. 3a. The periods of the measurement bodies can be derived from the sine 500 and cosine signal 505 detected by the sensor head. The period duration $t_{pol}$ can therefore be determined from the time to transfer a pole, which corresponds to a period. If the value of $t_{pol}$ is relatively small, and changes only slightly during transfer between consecutive poles, then it can be assumed that the sensor head moves with a relatively high and constant speed. This embodiment is based on such a situation.

During the specified period duration $t_{pol}$, the positional difference between an interpolated position which corresponds to an assumed actual position, and a constant assumed movement with $v_{const}$=pole period/$t_{pol}$ n times, in the present example seven times, is measured. In the case of a constant speed, the resulting positional difference values correspond to seven support points of the linearity deviation 510 which are arranged to be equidistant. By subtraction of the interpolated position, a linearly interpolated correction curve or support curve 515 (see right-hand part in FIG. 5b) is generated in the embodiment.

FIG. 5c, in which distance correction values $s_{kor}$ are applied over the distance s (movement distance of the sensor head) or the time t (movement time of the sensor head), shows only a previously described support curve 515 for simplified depiction. It must be noted that in the case of speed of the sensor head which is assumed to be constant, as in the present embodiment, the correction curve 515 depicted in FIG. 5c is identical or consistent both in the depiction over the distance s (dashed perpendicular bar in FIG. 5c) and in the depiction over time t (dotted line in FIG. 5c). As described by means of FIG. 2, the support curve 515 is added in real time to the position of the respectively subsequent pole.

It must be highlighted that the described linear interpolation only depicts one embodiment and the interpolation can also occur by means of a quadratic or sinusoidal curve or a curve based on a polynomial. The advantage of the linear methods is the relatively low technical effort and therefore also costs for implementation.

In the case of a sufficiently large number of support points and, as required for this embodiment as described above, relatively low change of the linearity and speed, the actual position in each subsequent pole can be determined relatively precisely by means of this procedure and the resulting linearity deviation can therefore be considerably reduced.

The described method therefore enables a dynamic linearisation in real time operation of the sensor system 100, 115, 120, as the adaptation or the compensation of linearity deviations occurs during the movement of the sensor head 100 between the individual poles of the measurement body 107, as it were, successively or "incrementally" from pole to pole. It is thereby particularly advantageous if, during the movement of the sensor head 100, the course of the linearity deviation, for example caused by changing the gap or the temperature, only changes by the specified small extent, i.e. changes only relatively slowly over several periods.

The corresponding method steps of the previously described method are depicted in FIG. 6 by means of a flow diagram. Firstly, the period duration $t_{pol}$ is measured and the scanning times for the next periods are determined 600. The average speed is calculated 605 from these values over an individual pole or an individual pole period according to the equation $v_{mittel}=s_{pol}/t_{pol}$, wherein $s_{pol}$ refers to the specified length of a pole or pole pair and $t_{pol}$ refers to the time to traverse a pole or pole pair (i.e. the specified period duration). The position of the sensor head is measured and stored 610 at any scanning time of the next period which is determined as above. The described support curve (as a correction curve of the linearity deviation) is determined 615 from these data for the assumed constant movement with the calculated speed $v_{mittel}$. The position of the subsequent period is corrected 620 by means of the support curve determined from the preceding periods, for example in the manner of a linear interpolation via the support points shown in FIG. 5c.

In the subsequently described embodiments, it is required that the sensor head is moved, contrary to the previously described embodiments, with a relatively low speed. Alternatively or additionally, speed changes occur as a result.

In the case of slow movement speeds or a standstill of the sensor head, the support points are not redetermined, but the last determined support points are used again for the time being since the sensor signals do not notably change as long as the distance of the sensor head from the measurement body does not clearly change. The procedure therefore corresponds to that in the case of the static linearisation according to FIG. 2.

Below, it is assumed that the movement speed of the sensor head is changed constantly, wherein the quadratic changes of the distance resulting therefrom can be approached linearly. As is evident from FIGS. 7a and 7b, only after expiry of a measurement period can it be determined that the speed has changed, because the full period is still not achieved for the sin/con signals after the present seven temporally equidistance scans 700 and the linearity deviation 705 resulting from this, i.e. the variable $s_{pol}$ no longer corresponds to the variable $t_{pol}$. For this reason, the correction curve 710 shown in FIG. 7b is also no longer correct, but the correction curve can subsequently no longer be adapted.

Figure 7B:
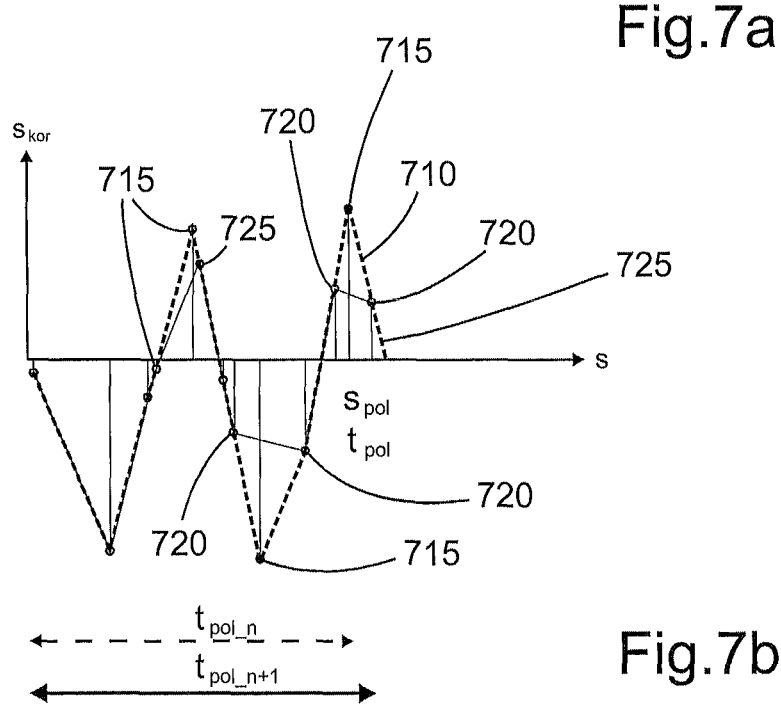

In order to adapt to the changed movement speed, in the subsequent measurement period, the correction curve is extended by forming new support points accordingly (FIG. 7b). For this, the support points 715 of the incorrect correction curve are firstly interpolated linearly. The thus formed curve 710 therefore corresponds to the actual linearity course during the past period. Due to the low movement speed, the curve points increasingly no longer fit the temporally equidistant measurement values. Therefore, the scanning points are no longer evenly distributed over the period.

To determine the new support points 720 for the subsequent period, the points for the subsequent periods $t_{pol\_n+1}$ are determined from the support points 715 of the existing corrective curve with $t_{pol\_n}$. For this, linear interpolation takes place between the existing support points 715. The thus formed curve is scanned equidistantly over the time duration $t_{pol\_n+1}$. In turn, a linear correction curve 725 is set via these thereby resulting points, which is used in the subsequent periods. Alternatively, the next period duration can be concluded on the basis of the changing period duration between the last and the current measurement, and the scanning times are selected accordingly, as it were, in the manner of a speed extrapolation.

It must be noted that with an increasing number of scanning points (i.e. more than the present seven scanning points), the earlier correction curve and the newly determined correction curve increasing correspond, i.e. the lower the correction error is. Furthermore, it is expedient to receive support points over at least two electrical periods as, in the case of constant disruptions, only two periods cover a magnetic north pole and a magnetic south pole. As the electrical signals detected via these two poles are the same, the linearity deviation has the periodicity of a magnetic pole. In the case that a constant outer magnetic field is overlapped, the signals measured at a north pole and at a south pole are different such that, in this case, the linearity deviation has the periodicity of two magnetic poles, i.e. the periodicity of a pole pair. As already explained, an electrical periodicity of two magnetic poles is also adjusted in the case of polarity-sensitive sensors, such as, for example, Hall sensors.

In the case of a further delay of the movement speed, a similar deviation results again, as above, which then is adapted accordingly. Due to the successive further formation of adapted correction curves, a dynamic adaptation of linearity deviations is therefore enabled.

Non-ideal properties of the detected sin and cos signals, such as, for example, properties relating to the offset, the amplitude, harmonic waves and/or phase shift, can be compensated for by means of the described methods. The larger the gap between the sensor head and the measurement body, the greater the pole width must be. Ideally, the electrical distance between the sin signal and the cos signal amounts to 90°. As the method according to the invention also enables the compensation of a phase shift, measurement bodies of different widths can also be used with a single sensor head, wherein the sensor head preferably has a magnetic field sensor pair with a fixed distance between the two sensors. In this case, the phase relationship of the two resulting signals is no more than 90°.

Figure 8B:
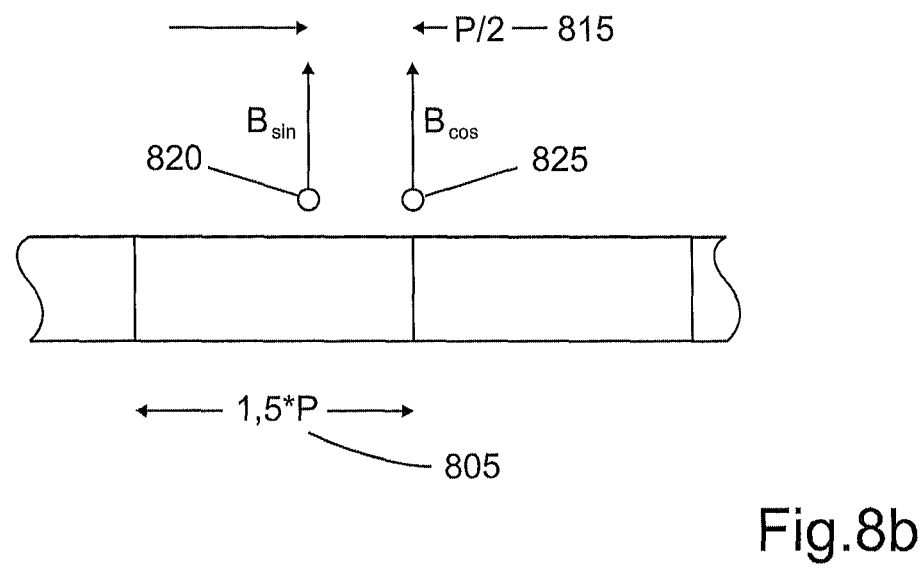

This is to be clarified by means of FIGS. 8*a* and 8*b*, in which two measurement situations are depicted in which the respective pole width 800, 805 is different. In FIG. 8*a*, the distance 810 between the two sensor elements 820, 825 corresponds exactly to half a pole width, i.e. for sensors which measure $B^2$, the electrical distance of the measurement signals amounts to exactly 90°. However, the pole width 805 in FIG. 8*b* is increased by 50%, however the distance 815 between the two sensor elements 820, 825 remains the same. Therefore, the measured (electrical) phase is <90°. In FIG. 9, resulting sensor signals 900, 905 are depicted for these electrical ratios. With the described method for dynamic adaptation of linearity deviations, measurements can be implemented without losses for the linearity deviation for both measurement bodies (FIG. 8*a* and FIG. 8*b*) with the same sensor head.

It must be noted that the currently valid support points can be permanently saved in order to consequently make them available again after a switching off of the measurement system. If the magnetic ratios have not substantially changed in the meantime, a sufficiently exact measurement signal can be detected and emitted after the switching back on.

It must furthermore be noted that the requirements on the quality of the sensor signals and therefore also the technical requirements on the measurement body can be reduced with the method according to the invention. The measurement body must only still supply a magnetic field which changes periodically, i.e. either S—N poles alternately or magnetically identical poles with alternating field strengths; the magnetic field between two adjacent poles may even thereby be changed slightly with regard to one or more of the specified influencing values, offset, amplitude, phase or harmonic waves. These conditions are, for example, fulfilled for a stator field of a linear motor, such that the stator field itself can be used for position determination, whereby for cost reasons, a measurement body described above can even be entirely omitted. However, measurement accuracy is thereby substantially determined by the positioning and magnetisation of the stator magnets. In FIG. 10, the signals 1000, 1005 to be expected therein are depicted. As is evident from FIG. 10, the phase shift between the sin signal and the cos signal is not exactly 90° and clearly recognisable harmonic waves are also present.

The invention claimed is:

1. Method for correcting deviations from linearity of a magnetic strip measuring system, in which a sensor head is moved along magnetic poles of a periodic measurement body,
   wherein the period of a magnetic pole is determined during the movement of the sensor head along the measurement body from a measurement signal,
   wherein during the determined period, a position difference between an assumed true interpolated position of the magnetic pole and a position gathered from n measurements of the magnetic pole is determined,
   wherein for the n measurements of the magnetic pole, movement of the sensor head with essentially constant speed is assumed,
   wherein an interpolated correction curve is generated on the basis of the determined position difference, and
   wherein, via the interpolated correction curve, non-linearities of the magnetic measuring strip measuring system are corrected dynamically during subsequent operation of the magnetic strip measuring system.

2. Method according to claim 1, wherein the correction curve is generated as a support point curve including discrete support points.

3. Method according to claim 2, wherein the correction curve is generated by linear interpolation between the support points.

4. Method according to claim 3, wherein the generated interpolated correction curve is added to a position of a respectively subsequent magnetic pole, the position being measured during operation of the magnetic strip measuring system.

5. Method according to claim 1, wherein an adaptation to a changed movement speed of the sensor head occurs by the correction curve being generated by changed support points which are formed by temporal extension in a respectively subsequent measurement period.

6. Method according to claim 5, wherein support points of a correction curve, which is incorrect as a consequence of a speed change during movement of the sensor head, are interpolated, and
   wherein new support points for a subsequent period are generated from the support points of the existing correction curve.

7. Method according to claim 6, wherein the new support points are generated by interpolation between the existing support points, and
   wherein a correction curve is generated from points obtained via equidistant scanning, which is used in the subsequent periods.

8. Method according to claim 1, wherein linearity deviations are compensated for during the movement of the sensor head between the poles of the measurement body by extrapolation from pole to pole, or from pole pair to pole pair.

9. Method according to claim 8, wherein the correction curve is generated as a support point curve including discrete support points.

\* \* \* \* \*